(12) United States Patent
Solomon et al.

(10) Patent No.: US 10,519,883 B2
(45) Date of Patent: Dec. 31, 2019

(54) CATALYST TEMPERATURE MAINTENANCE SYSTEMS AND METHODS

(71) Applicant: GM Global Technology Operations LLC, Detroit, MI (US)

(72) Inventors: Arun S. Solomon, Rochester Hills, MI (US); Kushal Narayanaswamy, Troy, MI (US); Gerald A. Szekely, Jr., Sterling Heights, MI (US); David P. Sczomak, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 54 days.

(21) Appl. No.: 15/995,579

(22) Filed: Jun. 1, 2018

(65) Prior Publication Data
US 2019/0368437 A1   Dec. 5, 2019

(51) Int. Cl.
| | |
|---|---|
| F02D 41/02 | (2006.01) |
| F02M 26/47 | (2016.01) |
| F02D 9/02 | (2006.01) |
| F01N 3/20 | (2006.01) |
| F02D 13/02 | (2006.01) |

(Continued)

(52) U.S. Cl.
CPC .......... *F02D 41/0235* (2013.01); *F01N 3/20* (2013.01); *F01N 9/00* (2013.01); *F02D 9/02* (2013.01); *F02D 13/0219* (2013.01); *F02D 41/0002* (2013.01); *F02D 41/0065* (2013.01); *F02D 41/30* (2013.01); *F02M 26/47* (2016.02); *F02P 5/1502* (2013.01); *F01N 2900/1602* (2013.01); *F02D 2009/0235* (2013.01);

(Continued)

(58) Field of Classification Search
CPC combination set(s) only.
See application file for complete search history.

(56) References Cited

U.S. PATENT DOCUMENTS 6,295,806 B1 * 10/2001 Poublon ................ F01N 11/005
  60/274
6,588,396 B1   7/2003 Cleary et al.
(Continued)

FOREIGN PATENT DOCUMENTS

WO   WO-20170095411 A1   6/2017

OTHER PUBLICATIONS

U.S. Appl. No. 15/355,343, filed Nov. 18, 2016, Solomon et al.
(Continued)

*Primary Examiner* — Binh Q Tran

(57) ABSTRACT

A catalyst temperature control system of a vehicle includes a fuel control module configured to control fuel injection based on a target air/fuel ratio that is fuel lean relative to a stoichiometric air/fuel ratio and a target fuel injection start timing. An exhaust gas recirculation (EGR) control module is configured to control an EGR valve based on a target EGR opening. An adjustment module is configured to, when a temperature of a catalyst in an exhaust system is less than a sum of a predetermined light-out temperature of the catalyst and a predetermined temperature and the target air/fuel ratio is fuel lean relative to the stoichiometric air/fuel ratio, based on a comparison of an engine speed and a predetermined engine speed, selectively adjust at least one of: a target throttle opening, a target spark timing, the target fuel injection start timing, the target air/fuel ratio, and the target EGR opening.

20 Claims, 5 Drawing Sheets

(51) Int. Cl.
*F02P 5/15* (2006.01)
*F02D 41/00* (2006.01)
*F02D 41/30* (2006.01)
*F01N 9/00* (2006.01)

(52) U.S. Cl.
CPC ............ *F02D 2009/0276* (2013.01); *F02D 2200/0802* (2013.01); *F02D 2200/101* (2013.01); *F02D 2200/1002* (2013.01)

(56) References Cited

U.S. PATENT DOCUMENTS

| | | |
|---|---|---|
| 6,745,745 B2 | 6/2004 | Huebler et al. |
| 7,128,063 B2 | 10/2006 | Kang |
| 7,441,537 B2 | 10/2008 | Szekely, Jr. et al. |
| 7,484,494 B2 | 2/2009 | Lippert et al. |
| 7,610,900 B2 | 11/2009 | Lippert et al. |
| 7,740,002 B2 | 6/2010 | Zeng et al. |
| 7,770,813 B2 | 8/2010 | Parrish |
| 7,899,601 B2 | 3/2011 | Yun et al. |
| 8,041,498 B2 | 10/2011 | Brown et al. |
| 8,146,555 B2 | 4/2012 | Solomon et al. |
| 8,186,329 B2 | 5/2012 | Wermuth et al. |
| 8,216,521 B2 | 7/2012 | Li et al. |
| 8,381,512 B2 | 2/2013 | Brinkman et al. |
| 8,387,448 B2 | 3/2013 | Li et al. |
| 8,393,140 B2 | 3/2013 | Perry et al. |
| 8,469,002 B2 | 6/2013 | Kang et al. |
| 8,755,988 B2 | 6/2014 | Parrish et al. |
| 8,857,154 B2 | 10/2014 | Mehta |
| 9,068,907 B1 | 6/2015 | Kang et al. |
| 9,347,395 B2 | 5/2016 | Parrish et al. |
| 9,394,838 B2 | 7/2016 | Guralp et al. |
| 9,435,281 B2 | 9/2016 | Parrish et al. |
| 9,470,154 B2 | 10/2016 | Rajagopalan et al. |
| 9,488,121 B2 | 11/2016 | Zhu et al. |
| 9,562,463 B2 | 2/2017 | Nagaoka et al. |
| 9,574,491 B2 | 2/2017 | Durrett et al. |
| 9,599,061 B2 | 3/2017 | Idicheria et al. |
| 9,605,708 B2 | 3/2017 | Durrett et al. |
| 9,617,930 B2 | 4/2017 | Kang et al. |
| 9,657,670 B2 * | 5/2017 | Wu .................... F01L 1/34 |
| 9,664,135 B2 | 5/2017 | Kang et al. |
| 9,677,464 B2 | 6/2017 | Durrett et al. |
| 9,689,339 B2 | 6/2017 | Kang et al. |
| 9,777,654 B2 | 10/2017 | Qi et al. |
| 9,803,580 B2 | 10/2017 | Yun et al. |
| 9,951,743 B2 | 4/2018 | Idicheria et al. |
| 2004/0000136 A1 * | 1/2004 | Miura ............... F01N 3/2006 60/284 |
| 2010/0223910 A1 * | 9/2010 | Funk ................. F02D 41/029 60/277 |
| 2011/0197851 A1 | 8/2011 | Parrish et al. |
| 2011/0202253 A1 | 8/2011 | Perry et al. |
| 2011/0288742 A1 | 11/2011 | Wermuth et al. |
| 2012/0080536 A1 | 4/2012 | Parrish et al. |
| 2012/0166067 A1 | 6/2012 | Parrish et al. |
| 2013/0018565 A1 | 1/2013 | Yun et al. |
| 2014/0123958 A1 | 5/2014 | Durrett et al. |
| 2015/0275792 A1 * | 10/2015 | Genslak ........... F02D 41/0255 60/274 |
| 2015/0377205 A1 | 12/2015 | Idicheria et al. |
| 2016/0069320 A1 | 3/2016 | Idicheria et al. |
| 2017/0198652 A1 | 7/2017 | Sczomak et al. |
| 2018/0252177 A1 * | 9/2018 | Myojo ............. F02D 41/0055 |

OTHER PUBLICATIONS

Disclosed anonymously; "Method of Aftertreatment Control"; Research Disclosure; The Industry Standard Disclosure Publication Service; research disclosure database No. 642046; published in the Oct. 2017 paper journal; published digitally Sep. 6, 2017; 3 pages.

* cited by examiner

CATALYST TEMPERATURE MAINTENANCE SYSTEMS AND METHODS

GOVERNMENT SUPPORT

This invention was made with government support under Grant No. DE-EE0006853 awarded by the U.S. Department of Energy Lean Miller Cooperative. The Government has certain rights in this invention.

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to internal combustion engines and more particularly to exhaust and actuator control systems and methods.

Air is drawn into an engine through an intake manifold. A throttle valve controls airflow into the engine. The air mixes with fuel from one or more fuel injectors to form an air/fuel mixture. The air/fuel mixture is combusted within one or more cylinders of the engine. Combustion of the air/fuel mixture generates drive torque and exhaust.

Exhaust is expelled from the cylinders to an exhaust system. The exhaust includes hydrocarbons (HC), carbon monoxide (CO), and nitrogen oxides ($NO_x$). The exhaust system includes one or more components, such as a catalyst (e.g., a three-way catalyst or a four-way catalyst), that reduce HC, CO, and $NO_x$ amounts in the exhaust before being expelled to atmosphere.

SUMMARY

In a feature, a catalyst temperature control system of a vehicle includes a fuel control module configured to control fuel injection of an engine based on a target air/fuel ratio that is fuel lean relative to a stoichiometric air/fuel ratio and a target fuel injection start timing. A spark control module is configured to control spark timing of the engine based on a target spark timing. An exhaust gas recirculation (EGR) control module is configured to, based on a target EGR opening, control opening of an EGR valve that recirculates exhaust from an exhaust system of the engine back to an intake system of the engine. A throttle control module is configured to control opening of a throttle valve based on a target throttle opening. An adjustment module is configured to, when a temperature of a catalyst in the exhaust system of the engine is less than a sum of a predetermined light-out temperature of the catalyst and a predetermined temperature and the target air/fuel ratio is fuel lean relative to the stoichiometric air/fuel ratio, based on a comparison of an engine speed and a predetermined engine speed, selectively adjust at least one of: the target throttle opening; the target spark timing; the target fuel injection start timing; the target air/fuel ratio; and the target EGR opening.

In further features, the adjustment module is configured to, when the engine speed is greater than the predetermined engine speed, at least one of: advance the target spark timing; advance the target fuel injection start timing; decrease the target air/fuel ratio; and increase the target EGR opening.

In further features, the adjustment module is configured to, when the engine speed is greater than the predetermined engine speed, all of: advance the target spark timing; advance the target fuel injection start timing; decrease the target air/fuel ratio; and increase the target EGR opening.

In further features, the adjustment module is configured to, when the engine speed is less than the predetermined engine speed, at least one of: retard the target spark timing; retard the target fuel injection start timing; increase the target air/fuel ratio; and decrease the target EGR opening.

In further features, the adjustment module is configured to, when the engine speed is less than the predetermined engine speed, all of: retard the target spark timing; retard the target fuel injection start timing; increase the target air/fuel ratio; and decrease the target EGR opening.

In further features, the adjustment module is configured to: when the engine speed is greater than the predetermined engine speed: advance the target spark timing; advance the target fuel injection start timing; decrease the target air/fuel ratio; and increase the target EGR opening; and when the engine speed is less than the predetermined engine speed: retard the target spark timing; retard the target fuel injection start timing; increase the target air/fuel ratio; and decrease the target EGR opening.

In further features, the adjustment module is configured to: adjust the target throttle opening toward a fully open throttle position as the temperature of the catalyst increases; and adjust the target throttle opening away from the fully open throttle position as the temperature of the catalyst decreases.

In further features, the adjustment module is further configured to, when the temperature of the catalyst is less than the sum of the predetermined light-out temperature of the catalyst and the predetermined temperature and the target air/fuel ratio is fuel lean relative to the stoichiometric air/fuel ratio: increase an amount of fuel into the exhaust system as the temperature of the catalyst decreases; and decrease the amount of fuel into the exhaust system as the temperature of the catalyst increases.

In further features, the predetermined temperature is greater than zero.

In a feature, a catalyst temperature control system of a vehicle includes a fuel control module configured to control fuel injection of an engine based on a target air/fuel ratio that is fuel lean relative to a stoichiometric air/fuel ratio and a target fuel injection start timing. A spark control module is configured to control spark timing of the engine based on a target spark timing. A phaser control module is configured to control an intake cam phaser angle based on a target intake cam phaser angle and to control an exhaust cam phaser angle based on a target exhaust cam phaser angle. An exhaust gas recirculation (EGR) control module is configured to, based on a target EGR opening, control opening of an EGR valve that recirculates exhaust from an exhaust system of the engine back to an intake system of the engine. A throttle control module is configured to control opening of a throttle valve based on a target throttle opening. An adjustment module is configured to maintain a temperature of a catalyst in the exhaust system above a predetermined light-out temperature of the catalyst, based on (i) a first comparison of a torque request with a predetermined torque and (ii) a second comparison of an engine speed with a predetermined engine speed, selectively adjusting at least one of: the target throttle opening; the target air/fuel ratio; the target fuel injection start timing; the target spark timing; the target intake cam phaser angle; the target exhaust cam phaser angle; and the target EGR opening.

In further features, the adjustment module is configured to maintain the temperature of the catalyst above the predetermined light-out temperature by, based on (i) the first comparison of the torque request with the predetermined torque and (ii) the second comparison of the engine speed with the predetermined engine speed, selectively adjusting at least two of: the target throttle opening; the target air/fuel ratio; the target fuel injection start timing; the target spark timing; the target intake cam phaser angle; the target exhaust cam phaser angle; and the target EGR opening.

In further features, the adjustment module is configured to maintain the temperature of the catalyst above the predetermined light-out temperature by, based on (i) the first comparison of the torque request with the predetermined torque and (ii) the second comparison of the engine speed with the predetermined engine speed, selectively adjusting all of: the target throttle opening; the target air/fuel ratio; the target fuel injection start timing; the target spark timing; the target intake cam phaser angle; the target exhaust cam phaser angle; and the target EGR opening.

In further features, the adjustment module is configured to maintain the temperature of the catalyst above the predetermined light-out temperature by: adjusting the target throttle opening toward a fully open throttle position as the temperature of the catalyst increases; and adjusting the target throttle away from the fully open throttle position as the temperature of the catalyst decreases.

In further features, the adjustment module is further configured to maintain the temperature of the catalyst above the predetermined light-out temperature by, when the temperature of the catalyst is less than a sum of the predetermined light-out temperature of the catalyst and a predetermined temperature and the target air/fuel ratio is fuel lean relative to the stoichiometric air/fuel ratio: increasing an amount of fuel into the exhaust system as the temperature of the catalyst decreases; and decreasing the amount of fuel into the exhaust system as the temperature of the catalyst increases.

In further features, the adjustment module is configured to maintain the temperature of the catalyst above the predetermined light-out temperature by, when the torque request is less than the predetermined torque: increasing the target air/fuel ratio; retarding the target fuel injection start timing; retarding the target spark timing; retarding the target intake cam phaser angle; retarding the target exhaust cam phaser angle; and decreasing the target EGR opening.

In further features, the adjustment module is configured to maintain the temperature of the catalyst above the predetermined light-out temperature by, when the engine speed is less than the predetermined engine speed: increasing the target air/fuel ratio; retarding the target fuel injection start timing; retarding the target spark timing; retarding the target intake cam phaser angle; retarding the target exhaust cam phaser angle; and decreasing the target EGR opening.

In further features, the adjustment module is configured to maintain the temperature of the catalyst above the predetermined light-out temperature by, when the torque request is less than the predetermined torque and the engine speed is less than the predetermined engine speed: increasing the target air/fuel ratio; retarding the target fuel injection start timing; retarding the target spark timing; retarding the target intake cam phaser angle; retarding the target exhaust cam phaser angle; and decreasing the target EGR opening.

In further features, the adjustment module is further configured to, when the torque request is greater than the predetermined torque: decrease the target air/fuel ratio; advance the target fuel injection start timing; advance the target spark timing; advance the target intake cam phaser angle; advance the target exhaust cam phaser angle; and increase the target EGR opening.

In further features, the adjustment module is further configured to, when the engine speed is greater than the predetermined engine speed: decrease the target air/fuel ratio; advance the target fuel injection start timing; advance the target spark timing; advance the target intake cam phaser angle; advance the target exhaust cam phaser angle; and increase the target EGR opening.

In further features, the adjustment module is further configured to, when the engine speed is greater than the predetermined engine speed and the torque request is greater than the predetermined torque: decrease the target air/fuel ratio; advance the target fuel injection start timing; advance the target spark timing; advance the target intake cam phaser angle; advance the target exhaust cam phaser angle; and increase the target EGR opening.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
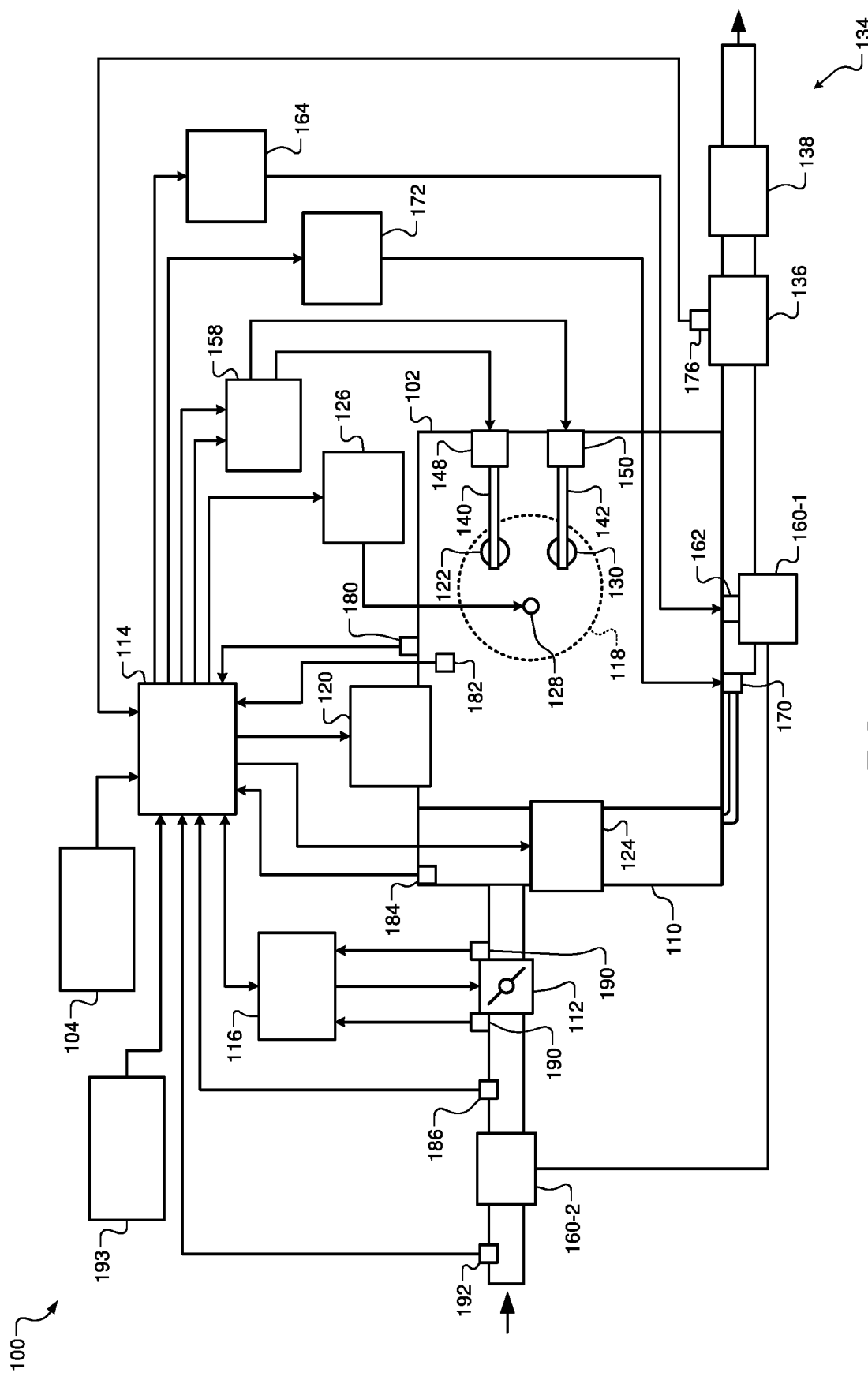
FIG. 1 is a functional block diagram of an example engine system of a vehicle.

An engine combusts air and fuel within cylinders to generate drive torque. An engine control module (ECM) controls air and fuel to the engine based on a target air/fuel ratio. For lean burn engines, the target air/fuel ratio is fuel lean relative to a stoichiometric air/fuel ratio. For example, stoichiometry for air and gasoline is approximately 14.7:1, while a lean burn gasoline engine may have a target air/fuel ratio of 16:1 air to gasoline across all of the cylinders or a greater amount of air, such as 20:1, 30:1, 50:1, etc. Different types of fuel have different stoichiometric air/fuel ratios.

Combustion of air and fuel also generates heat and exhaust. Exhaust produced by the engine flows through an exhaust system before being expelled to atmosphere. The exhaust may include one or more constituents, such as hydrocarbons (HC), carbon monoxide (CO), and nitrogen oxides ($NO_x$). The exhaust system includes one or more components that reduce the amount of exhaust constituents before the exhaust is expelled to atmosphere.

For example, the exhaust system may include a catalyst, such as a three-way catalyst (TWC) or a four-way catalyst, that receives exhaust output from the engine. The catalyst is heated via the exhaust and the exhaust system.

A conversion efficiency of the catalyst is indicative of the ability of the catalyst to react with the exhaust constituents. The conversion efficiency of the catalyst is related to temperature of the catalyst. For example, the conversion efficiency of the catalyst increases as the temperature of the catalyst increases and vice versa. The catalyst may have a light-off temperature which refers to a predetermined temperature at which the exhaust increases the temperature of the catalyst high enough so that the conversion efficiency of the catalyst is greater than a predetermined conversion efficiency. For example, the light-off temperature may be 300 degrees Celsius and the predetermined conversion efficiency may be greater than 50%.

The catalyst may also have a light-out temperature. The light-out temperature refers to a predetermined minimum temperature at which the exhaust is low enough such that the catalyst operates at a minimum conversion efficiency. For example, the light-out temperature may be 250 degrees Celsius and the minimum conversion efficiency may be less than 50%.

Under low engine load conditions, such as when a vehicle is decelerating (e.g., braking), the temperature of the catalyst may fall below the catalyst light-out temperature (e.g., less than 250 degrees Celsius). Thus, the conversion efficiency of the catalyst may fall below the minimum conversion efficiency under low engine load conditions.

According to the present disclosure, a control module (e.g., the ECM) may control and adjust one or more engine operating parameters to maintain the temperature of the catalyst above the light-out temperature (e.g. greater than 250 degrees Celsius), even under low engine load conditions. For example, the control module may delay combustion timing when engine load and/or engine speed are less than predetermined amounts. Conversely, the control module may advance the combustion timing when engine load and/or engine speed are greater than the predetermined amounts. Additionally or alternatively, the control module may control an opening of a throttle valve based on the temperature of the catalyst to maintain the temperature of the catalyst above the light-out temperature. Additionally or alternatively, the control module may control one or more fuel injectors to inject a predetermined amount of fuel into the exhaust to maintain the temperature of the catalyst above the light-out temperature.

Referring now to FIG. 1, a functional block diagram of an example engine system 100 of a vehicle is presented. The engine system 100 includes an engine 102 that combusts an air/fuel mixture to produce drive torque for the vehicle based on driver input from a driver input module 104, such as accelerator pedal position and/or brake pedal position. While the engine 102 is shown and will be discussed as a gasoline type lean burn engine, the engine 102 may be another type of lean burn engine. One or more electric motors (or motor-generators) may additionally or alternatively generate drive torque for the vehicle.

Air is drawn into an intake manifold 110 through a throttle valve 112. For example, the throttle valve 112 may include a butterfly valve having a rotatable blade or another suitable type of throttle valve. An engine control module (ECM) 114 controls a throttle actuator module 116, and the throttle actuator module 116 regulates opening of the throttle valve 112 to control the amount of air drawn into the intake manifold 110.

Air from the intake manifold 110 is drawn into cylinders of the engine 102. While the engine 102 may include multiple cylinders, for illustration purposes a single representative cylinder 118 is shown. For example, the engine 102 may include 2, 3, 4, 5, 6, 8, 10, and/or 12 cylinders. Under some circumstances, the ECM 114 may instruct a cylinder actuator module 120 to selectively deactivate opening of intake and exhaust valves of one or more of the cylinders, which may improve fuel economy under certain engine operating conditions.

The engine 102 may operate using a four-stroke cycle. The four strokes, described below, may be referred to as the intake stroke, the compression stroke, the combustion stroke, and the exhaust stroke. During each revolution of a crankshaft (not shown), two of the four strokes occur within the cylinder 118. Therefore, two crankshaft revolutions are necessary for the cylinder 118 to experience all four of the strokes.

During the intake stroke, air from the intake manifold 110 is drawn into the cylinder 118 through an intake valve 122. The ECM 114 controls a fuel actuator module 124, which regulates fuel injection to achieve a target air/fuel ratio. Fuel may be injected into the intake manifold 110 at a central location or at multiple locations, such as near the intake valve 122 of each of the cylinders. In various implementations (not shown), fuel may be injected directly into the cylinders or into mixing chambers associated with the cylinders. The fuel actuator module 124 may halt injection of fuel to cylinders that are deactivated.

The injected fuel mixes with air and creates an air/fuel mixture in the cylinder 118. During the compression stroke, a piston (not shown) within the cylinder 118 compresses the air/fuel mixture. A spark actuator module 126 energizes a spark plug 128 in the cylinder 118 based on a signal from the ECM 114, which ignites the air/fuel mixture. The timing of the spark may be specified relative to the time when the piston is at its topmost position, referred to as top dead center (TDC).

The spark actuator module 126 may be controlled by a timing signal specifying how far before or after TDC to generate the spark. Because piston position is directly related to crankshaft rotation, operation of the spark actuator module 126 may be synchronized with crankshaft angle. Generating spark may be referred to as a firing event. The spark actuator module 126 may have the ability to vary the timing of the spark for each firing event. The spark actuator module 126 may vary the spark timing for a next firing event when the spark timing is changed between a last firing event and the next firing event. The spark actuator module 126 may halt provision of spark to deactivated cylinders.

During the combustion stroke, the combustion of the air/fuel mixture drives the piston down from TDC, thereby driving the crankshaft. The combustion stroke may be defined as the time between the piston reaching TDC and the time at which the piston reaches bottom dead center (BDC). During the exhaust stroke, the piston begins moving up from BDC and expels the byproducts of combustion through an exhaust valve 130. The byproducts of combustion are exhausted from the vehicle via an exhaust system 134.

The exhaust system 134 includes a catalyst 136, such as a three-way catalyst (TWC) or a four-way catalyst, that receives exhaust output from the engine 102. The catalyst 136 is heated via the exhaust and the exhaust system 134. The catalyst 136 reacts with components of the exhaust, such as hydrocarbons (HC), carbon monoxide (CO), and nitrogen oxides ($NO_x$) etc., flowing through the catalyst 136, thereby reducing HC, CO, and $NO_x$ output.

Exhaust output from the catalyst 136 flows to a selective catalyst reduction (SCR) catalyst 138. The catalyst 136 may generate and supply ammonia to the SCR catalyst 138 when fueling of the engine 102 is fuel rich relative to stoichiometry. The SCR catalyst 138 stores ammonia and reacts with $NO_x$ flowing through the SCR catalyst 138, thereby reducing $NO_x$ output. Output from the SCR catalyst 138 is expelled to atmosphere.

The intake valve 122 may be controlled by an intake camshaft 140, while the exhaust valve 130 may be controlled by an exhaust camshaft 142. In various implementations, the intake valve 122 and/or the exhaust valve 130 may be controlled by devices other than camshafts, such as camless valve actuators. The cylinder actuator module 120 may deactivate the cylinder 118 by disabling opening of the intake valve 122 and/or the exhaust valve 130.

An intake cam phaser 148 selectively adjusts rotation of the intake camshaft 140 relative to rotation of the crankshaft. Adjusting the rotation of the intake camshaft 140 adjusts opening and closing timing of the intake valve 122. An exhaust cam phaser 150 selectively adjusts rotation of the exhaust camshaft 142 relative to rotation of the crankshaft. Adjusting the rotation of the exhaust camshaft 142 adjusts opening and closing timing of the exhaust valve 130.

A phaser actuator module 158 controls the intake cam phaser 148 and the exhaust cam phaser 150 based on signals from the ECM 114. When implemented, variable valve lift (not shown) may also be controlled by the phaser actuator module 158. The phaser actuator module 158 may also control second intake and exhaust cam phasers based on signals from the ECM 114.

The engine system 100 may include a boost device that provides pressurized air to the intake manifold 110. For example, a turbocharger including a turbine 160-1 that is powered by exhaust gases flowing through the exhaust system 134. The turbocharger also includes a compressor 160-2, driven by the turbine 160-1, that compresses air leading into the throttle valve 112. In various implementations, a supercharger (not shown), driven by the crankshaft, may compress air from the throttle valve 112 and deliver the compressed air to the intake manifold 110.

A wastegate 162 may allow exhaust to bypass the turbine 160-1, thereby reducing the boost (the amount of intake air compression) provided by the turbocharger. The ECM 114 may control the turbocharger via a boost actuator module 164. The boost actuator module 164 may modulate the boost of the turbocharger by controlling the position of the wastegate 162. In various implementations, two or more turbochargers may be implemented and may be controlled by the boost actuator module 164. The turbocharger may have variable geometry, which may be controlled by the boost actuator module 164.

An air cooler (not shown) may transfer heat from the compressed air charge to a cooling medium, such as engine coolant or air. An air cooler that cools the compressed air charge using engine coolant may be referred to as an intercooler. An air cooler that cools the compressed air charge using air may be referred to as a charge air cooler. The compressed air charge may receive heat, for example, via compression and/or from components of the exhaust system 134. Although shown separated for purposes of illustration, the turbine 160-1 and the compressor 160-2 may be attached to each other, placing intake air in close proximity to hot exhaust.

The engine system 100 may include an exhaust gas recirculation (EGR) valve 170, which selectively redirects exhaust gas back to the intake manifold 110. The EGR valve 170 may be located upstream of the turbocharger's turbine 160-1. The EGR valve 170 may be controlled by an EGR actuator module 172 based on signals from the ECM 114.

A catalyst temperature sensor 176 measures a temperature of the catalyst 136. For example, the catalyst temperature sensor 176 may be located within the catalyst 136. Alternatively, the catalyst temperature sensor 176, for example, may be located at an inlet of the catalyst 136 or at other suitable locations in the exhaust system 134.

A position of the crankshaft may be measured using a crankshaft position sensor 180. A temperature of the engine coolant may be measured using an engine coolant temperature (ECT) sensor 182. The ECT sensor 182 may be located within the engine 102 or at other suitable locations where the coolant is circulated, such as a radiator (not shown).

A pressure within the intake manifold 110 may be measured using a manifold absolute pressure (MAP) sensor 184. In various implementations, engine vacuum, which is the difference between ambient air pressure and the pressure within the intake manifold 110, may be measured. A mass flow rate of air flowing into the intake manifold 110 may be measured using a mass air flow (MAF) sensor 186. In various implementations, the MAF sensor 186 may be located in a housing that also includes the throttle valve 112.

The throttle actuator module 116 may monitor the position of the throttle valve 112 using one or more throttle position sensors (TPS) 190. An ambient temperature of air being drawn into the engine 102 may be measured using an intake air temperature (IAT) sensor 192. The engine system 100 may also include one or more other sensors 193. The other sensors 193 may include, for example, an exhaust temperature sensor located upstream of the catalyst 136, an oxygen sensor located upstream of the catalyst 136, an oxygen sensor located downstream of the catalyst 136, an EGR position sensor, and/or one or more other suitable sensors. The exhaust temperature sensor located upstream of the catalyst 136 measures a temperature of the exhaust. The oxygen sensor located upstream of the catalyst 136 measures an amount (e.g., concentration) of oxygen flowing into the catalyst 136. The oxygen sensor located downstream of the catalyst 136 measures an amount (e.g., concentration) of oxygen flowing out of the catalyst 136. The other sensors 193 may also include an accelerator pedal position (APP) sensor. An APP sensor measures a position of an accelerator pedal within a passenger cabin of the vehicle. The ECM 114 may use signals from the sensors to make control decisions for the engine system 100.

Each system of the engine 102 that varies an engine parameter may be referred to as an engine actuator. For example, the throttle actuator module 116 may control the throttle valve 112 to achieve a target throttle opening area. The spark actuator module 126 controls the spark plugs to achieve a target spark timing relative to piston TDC. The fuel actuator module 124 controls the fuel injectors to achieve target fueling parameters. The phaser actuator module 158 may control the intake and exhaust cam phasers 148 and 150 to achieve target intake and exhaust cam phaser angles, respectively. The EGR actuator module 172 may control the EGR valve 170 to achieve a target EGR opening area. The boost actuator module 164 controls the wastegate 162 to achieve a target wastegate opening area. The cylinder actuator module 120 controls cylinder activation/deactivation to achieve a target number of activated or deactivated cylinders. The ECM 114 generates target values for the engine actuators to cause the engine 102 to generate a requested engine output torque.

Figure 2:
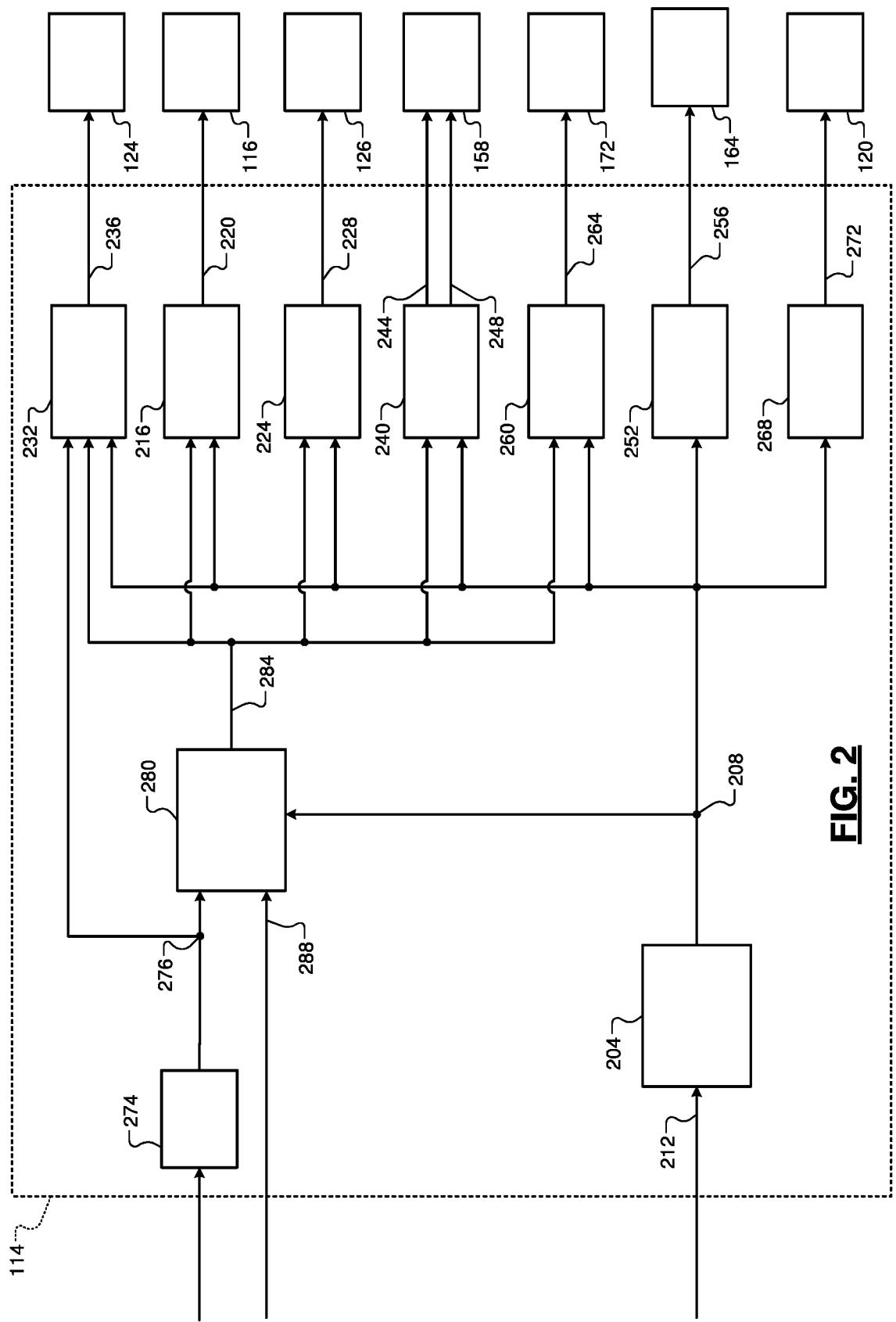
FIG. 2 is a functional block diagram of an example engine control module.

Referring now to FIG. 2, a functional block diagram of an example implementation of the ECM 114 is presented. An engine speed module 274 may determine an engine speed 276, for example in revolutions per minute (RPM), based on the position of the crankshaft. The position of the crankshaft may be measured using the crankshaft position sensor 180 or determined based on one or more other measured parameters.

A torque request module 204 may determine a torque request 208 based on one or more driver inputs 212. The driver inputs 212 may include, for example, an accelerator pedal position, a brake pedal position, a cruise control input, and/or one or more other suitable driver inputs. The torque request module 204 may determine the torque request 208 additionally or alternatively based on one or more torque requests, such as torque requests generated by the ECM 114 and/or torque requests received from other modules of the vehicle, such as a transmission control module, the hybrid control module, a chassis control module, etc. The torque request module 204 may determine the torque request 208, for example, using one or more lookup tables and/or equations that relate driver inputs to torque requests. While the example of the torque request 208 is provided, another parameter that is indicative of an engine load may be used.

One or more engine actuators may be controlled based on the torque request 208 and/or one or more other vehicle operating parameters. For example, a throttle control module 216 may determine a target throttle opening 220 based on the torque request 208. The throttle actuator module 116 may control opening of the throttle valve 112 based on the target throttle opening 220. A spark control module 224 determines a target spark timing 228 based on the torque request 208. The spark actuator module 126 generates spark based on the target spark timing 228.

A fuel control module 232 determines one or more target fueling parameters 236 based on the torque request 208. For example, the target fueling parameters 236 may include fuel injection amount, number of fuel injections for injecting the amount, and timing for each of the injections. More specifically, the fuel control module 232 may determine a mass of fuel to inject to achieve a target air/fuel ratio with a mass of air trapped within the cylinder. The fuel control module 232 determines the target air/fuel ratio, for example, based on the engine speed 276 and the torque request 208. The fuel control module 232 may determine the target air/fuel ratio, for example, using one or more lookup tables and/or equations that relate engine speeds and torque requests to target air/fuel ratios. The fuel actuator module 124 injects fuel based on the target fueling parameters 236.

A phaser control module 240 determines target intake and exhaust cam phaser angles 244 and 248 based on the torque request 208. The phaser actuator module 158 may regulate the intake and exhaust cam phasers 148 and 150 based on the target intake and exhaust cam phaser angles 244 and 248, respectively. A boost control module 252 may determine a target boost 256 based on the torque request 208. The boost actuator module 164 controls boost of the turbocharger based on the target boost 256. For example, the boost actuator module 164 may control opening of the wastegate 162 based on the target boost 256.

An EGR control module 260 determines a target EGR opening 264 based on the torque request 208. The EGR actuator module 172 controls the EGR valve 170 based on the target EGR opening 264. A cylinder control module 268 may determine a target number of cylinders to activate and/or deactivate 272 based on the torque request 208. The cylinder actuator module 120 activates and deactivates opening of intake and exhaust valves of cylinders of the engine 102 based on the target number 272. The fuel control module 232 disables fueling of deactivated cylinders.

An adjustment module 280 may determine an adjustment 284 based on the engine speed 276 and the torque request 208. For example, the adjustment module 280 may determine the adjustment 284 using one or more lookup tables and/or equations that relate engine speeds and torque requests to adjustments. The adjustment 284 includes one or more adjustments to one or more of the targets to maintain the temperature of the catalyst 136 from becoming less than the light-out temperature. For example, the adjustment 284 may include an adjustment for the target spark timing 228, an adjustment for the target fueling parameters 236, adjustments for the target intake and exhaust cam phaser angles 244 and 248, and an adjustment for the target EGR opening 264.

When at least one of (i) the engine speed 276 is less than a predetermined engine speed and (ii) the torque request 208 is less than a predetermined torque, the adjustment module 280 via the adjustment 284 may delay combustion (e.g., a start of combustion, which also delays the rest of the combustion). For example, the spark control module 224 may set the target spark timing 228 to a predetermined retarded spark timing based on the adjustment 284. The predetermined engine speed, for example, may be approximately 3000 RPM or another suitable engine speed. The predetermined torque, for example, may be 600 kilopascals (kPa) brake mean effective pressure (BMEP) or another suitable torque.

When combustion is delayed, the adjustment 284 may adjust one or more of the other target values. For example, in response to the adjustment 284, the EGR control module 260 may set the target EGR opening 264 to a first predetermined EGR opening, where the first predetermined EGR opening may be less than the target EGR opening area. In response to the adjustment 284, the phaser control module 240 may set the target intake and exhaust cam phaser angles 244 and 248 to predetermined retarded intake and exhaust cam phaser angles, respectively.

During delayed combustion, the fuel control module 232 may, for example, set the target fueling parameters 236 to first predetermined fueling parameters. The first predetermined fueling parameters include a first predetermined air/fuel ratio. The first predetermined air/fuel ratio is fuel lean relative to the target air/fuel ratio and the stoichiometric air/fuel ratio. Different types of fuel have different stoichiometric air/fuel ratios. As an example, the first predetermined air/fuel ratio for gasoline is approximately 40:1. The target air/fuel ratio may be approximately 30:1, and the stoichiometric air/fuel ratio is approximately 14.7:1 air for gasoline.

Leaning of the air/fuel ratio from the target air/fuel ratio to the first predetermined air/fuel ratio, while adjusting the EGR valve 170 to the first predetermined EGR opening allows the intake manifold 110 to maintain an approximately constant MAP. The first predetermined fueling parameters may also include setting fuel injection timing to a predetermined retarded fuel injection timing. The predetermined retarded fuel injection timing is retarded relative to a target fuel injection timing for the present operating conditions.

When at least one of (i) the engine speed 276 is greater than the predetermined engine speed (e.g., approximately 3000 RPM) and (ii) the torque request 208 is greater than the predetermined torque (e.g., 600 kPa BMEP), the adjustment module 280 via the adjustment 284 may advance combustion (e.g., a start of combustion, which also advances the rest of the combustion). For example, the spark control module 224 may set the target spark timing 228 to a predetermined advanced spark timing. The predetermined advanced spark timing is advanced (in crankshaft position) relative to a target spark timing for the present operating conditions.

When combustion is advanced, the adjustment 284 may adjust one or more of the other target values. For example, in response to the adjustment 284, the EGR control module 260 may set the target EGR opening 264 to a second predetermined EGR opening, where the second predetermined EGR opening may be greater than the target EGR opening area. In response to the adjustment 284, the phaser control module 240 may also set the target intake and exhaust cam phaser angles 244 and 248 to predetermined advanced intake and exhaust cam phaser angles, respectively. The predetermined advanced intake and exhaust cam phaser angles are advanced relative to the predetermined retarded intake and exhaust cam phaser angles.

During advanced combustion, the fuel control module 232 may, for example, set the target fueling parameters 236 to second predetermined fueling parameters. The second predetermined fueling parameters include a second predetermined air/fuel ratio. The second predetermined air/fuel ratio is fuel rich relative to the target air/fuel ratio but fuel lean relative to the stoichiometric air/fuel ratio. As an example, the second predetermined air/fuel ratio for gasoline may be approximately 20:1. The target air/fuel ratio may be approximately 30:1, and the stoichiometric air/fuel ratio is approximately 14.7:1 air for gasoline.

Richening of the air/fuel ratio from the target air/fuel ratio to the second predetermined air/fuel ratio, while adjusting the EGR valve 170 to the second predetermined EGR opening allows the intake manifold 110 to maintain an approximately constant MAP. The second predetermined fueling parameters may also include setting fuel injection timing to predetermined advanced fuel injection timing. The predetermined advanced fuel injection timing is advanced relative to the target fuel injection timing for the present operating conditions.

Delaying and/or advancing combustion allows more combustion heat to be provided to the catalyst 136. Providing more heat to the catalyst 136 may help maintain the temperature of the catalyst 136 above the light-out temperature (e.g., greater than 250 degrees Celsius).

Additionally or alternatively, the adjustment module 280 may determine an adjusted throttle opening based on a catalyst temperature 288. For example, the adjustment module 280 may determine the adjusted throttle opening using one or more lookup tables and/or equations that relate catalyst temperatures to adjusted throttle opening.

The throttle control module 216 may set the target throttle opening 220 to the adjusted throttle opening. The opening of the throttle valve 112 changes the catalyst temperature 288. For example, the catalyst temperature 288 may decrease as opening of the throttle valve 112 increases (e.g., indicative of more air being drawn into the intake manifold 110) and vice versa. As opening of the throttle valve 112 increases, the air/fuel ratio becomes more fuel lean than the stoichiometric air/fuel ratio. The catalyst temperature 288 corresponds to a temperature of the catalyst 136. The catalyst temperature 288 may be measured using the catalyst temperature sensor 176 or determined based on one or more other measured parameters.

Additionally or alternatively, the adjustment module 280 may determine an exhaust fuel injection amount based on the catalyst temperature 288. For example, the adjustment module 280 may determine the exhaust fuel injection amount using one or more lookup tables and/or equations that relate catalyst temperatures to exhaust fuel injection amounts. The exhaust fuel injection amount may correspond to an amount of fuel for injection into the exhaust system 134. The fuel control module 232 may set the target fueling parameters 236 to include the exhaust fuel injection amount. For example, as the catalyst temperature 288 decreases, the adjustment module 280 may increase the exhaust fuel injection amount and vice versa.

The amount of fuel injected into the exhaust system 134 changes the catalyst temperature 288. For example, catalyst temperature 288 may increase more (and more quickly) as the amount of fuel injected into the exhaust system 134 increases. The amount of fuel to be provided to the exhaust system 134 may be injected, for example, within the cylinders (e.g., during the exhaust stroke) and/or directly into the exhaust system 134 upstream of the catalyst 136. Fuel in the exhaust system 134 combusts and generates additional heat to warm the catalyst 136.

Figure 3:
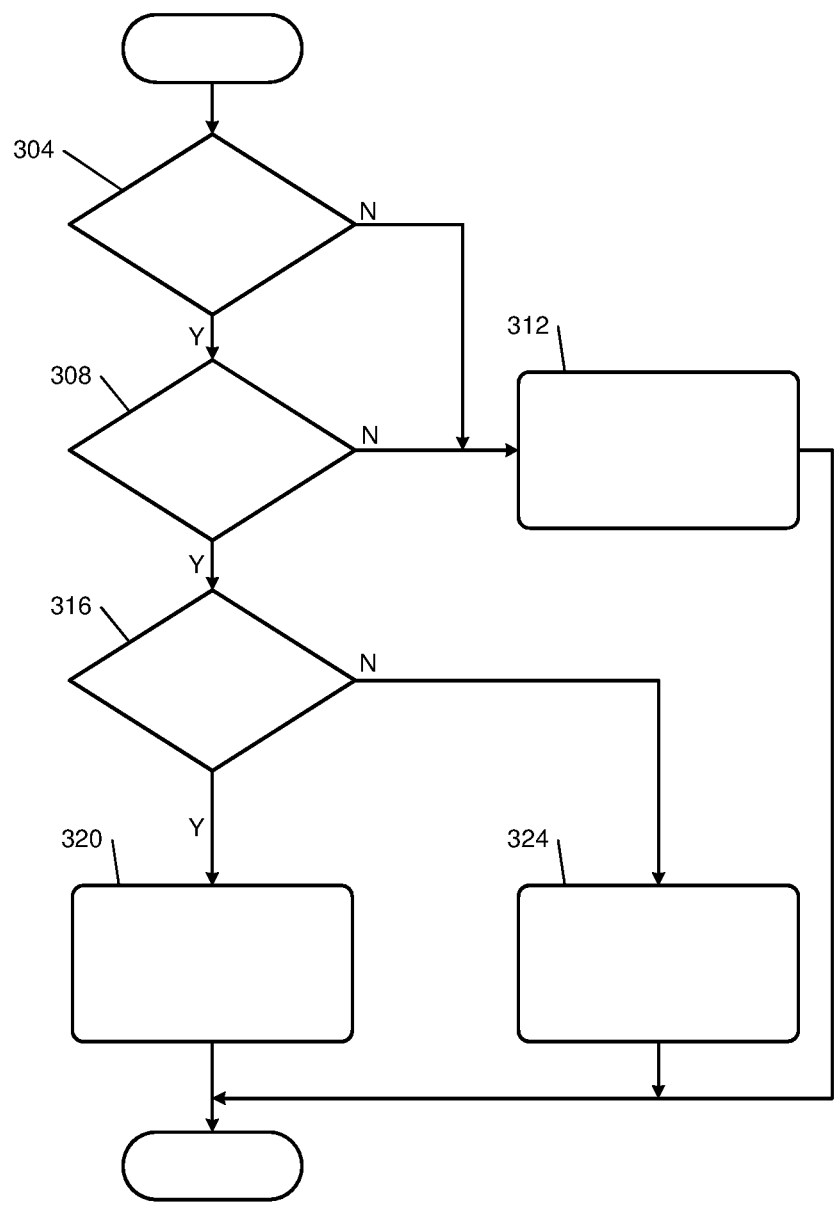
FIGS. 3 and 4 are flowcharts depicting example methods of adjusting engine operating parameters for maintaining a temperature of a catalyst above a light-out temperature of the catalyst.

FIG. 3 is a flowchart depicting an example method of adjusting engine parameters for maintaining the catalyst temperature 288 above the light-out temperature. Control begins with 304 where the adjustment module 280 determines whether the engine 102 is operating in a lean burn mode. For example, the adjustment module 280 may determine whether the target air/fuel ratio is less than or equal to 20:1 for gasoline and/or whether the torque request 208 is less than the predetermined torque. In various implementations, the adjustment module 280 may determine whether the engine load is less than a predetermined load at 304. The engine 102 may be operated in the lean burn mode when the engine load is less than the predetermined load. If 304 is true, control may continue with 308. If 304 is false, the adjustment module 280 may not adjust the target values and control may continue with normal engine operation at 312. Normal engine operation may include the respective modules determining the target actuator values based on the torque request 208 and controlling the engine actuators based on the respective target actuator values.

At 308, the adjustment module 280 determines whether the catalyst temperature 288 is less than a sum of the light-out temperature of the catalyst and a predetermined hysteresis temperature (e.g., light-out temperature+predetermined hysteresis temperature). The predetermined hysteresis temperature is a positive value and may be, for example, 5 degrees Celsius, 10 degrees Celsius, or another suitable temperature. If 308 is false, the adjustment module 280 may not adjust the target values and control may continue with normal engine operation at 312, as discussed above. If 308 is true, control continues with 316.

At 316, the adjustment module 280 determines whether the engine speed 276 is less than the predetermined engine speed (e.g., approximately 3000 RPM). If 316 is false, control continues with 324. If 316 is true, control continues with 320. At 320, the adjustment module 280 sets the adjustment 284 to delay combustion. Based on the adjustment 284, at least one, at least two, or all of the spark control module 224 may set the target spark timing 228 to the predetermined retarded spark timing, the EGR control module 260 may set the target EGR opening 264 to the first predetermined EGR opening, the fuel control module 232 may set the target fueling parameters 236 to first predetermined fueling parameters, and the phaser control module 240 may set the target intake and exhaust cam phaser angles 244 and 248 to the predetermined retarded intake and exhaust cam phaser angles, respectively. At 324, the adjustment module 280 sets the adjustment 284 to advance combustion. Based on the adjustment 284, at least one, at least two, or all of the spark control module 224 may set the target spark timing 228 to the predetermined advanced spark timing, the EGR control module 260 may set the target EGR opening 264 to the second predetermined EGR opening, the fuel control module 232 may set the target fueling parameters 236 to second predetermined fueling parameters, and the phaser control module 240 may set the target intake and exhaust cam phaser angles 244 and 248 to the predetermined advanced intake and exhaust cam phaser angles, respectively. While control is shown and discussed as ending, the example of FIG. 3 may be illustrative of one control loop and control may return to 304.

Figure 5:
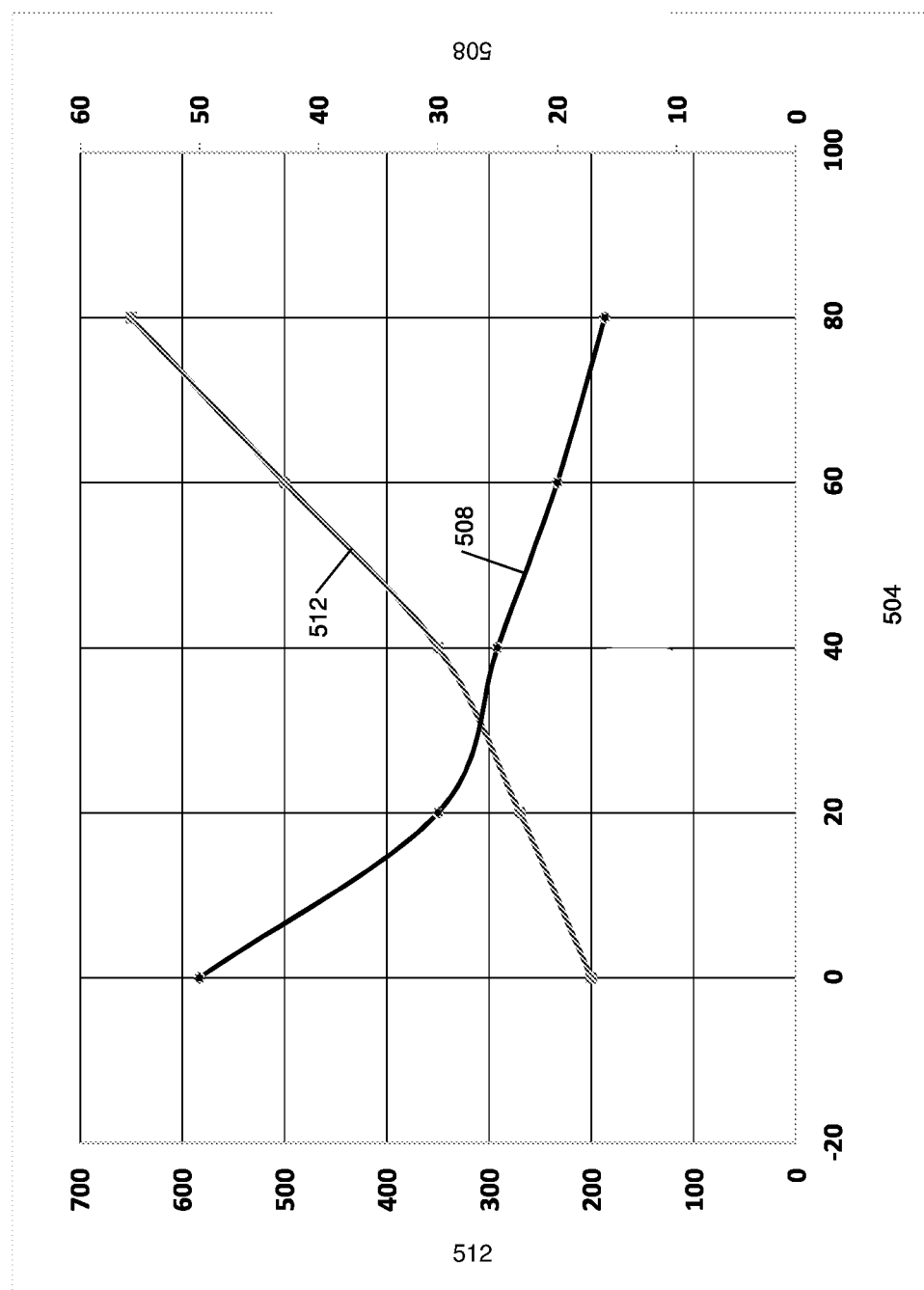
FIG. 5 illustrates an example graph of target throttle openings 504 (in percent closed) and air/fuel ratio 508 as a function of catalyst temperature 512.

Additionally or alternatively to the above, the adjustment module 280 may adjust the target throttle opening 220 based on the catalyst temperature at 320 or 324. For example, the adjustment module 280 may adjust the target throttle opening 220 away from a predetermined fully open throttle position (e.g., decrease the target throttle opening 220) as the catalyst temperature decreases. The adjustment module 280 may adjust the target throttle opening 220 toward the predetermined fully open throttle position (e.g., increase the target throttle opening 220) as the catalyst temperature increases. FIG. 5 illustrates an example graph of target throttle openings 504 (in percent closed) and air/fuel ratio 508 as a function of catalyst temperature 512.

Figure 4:
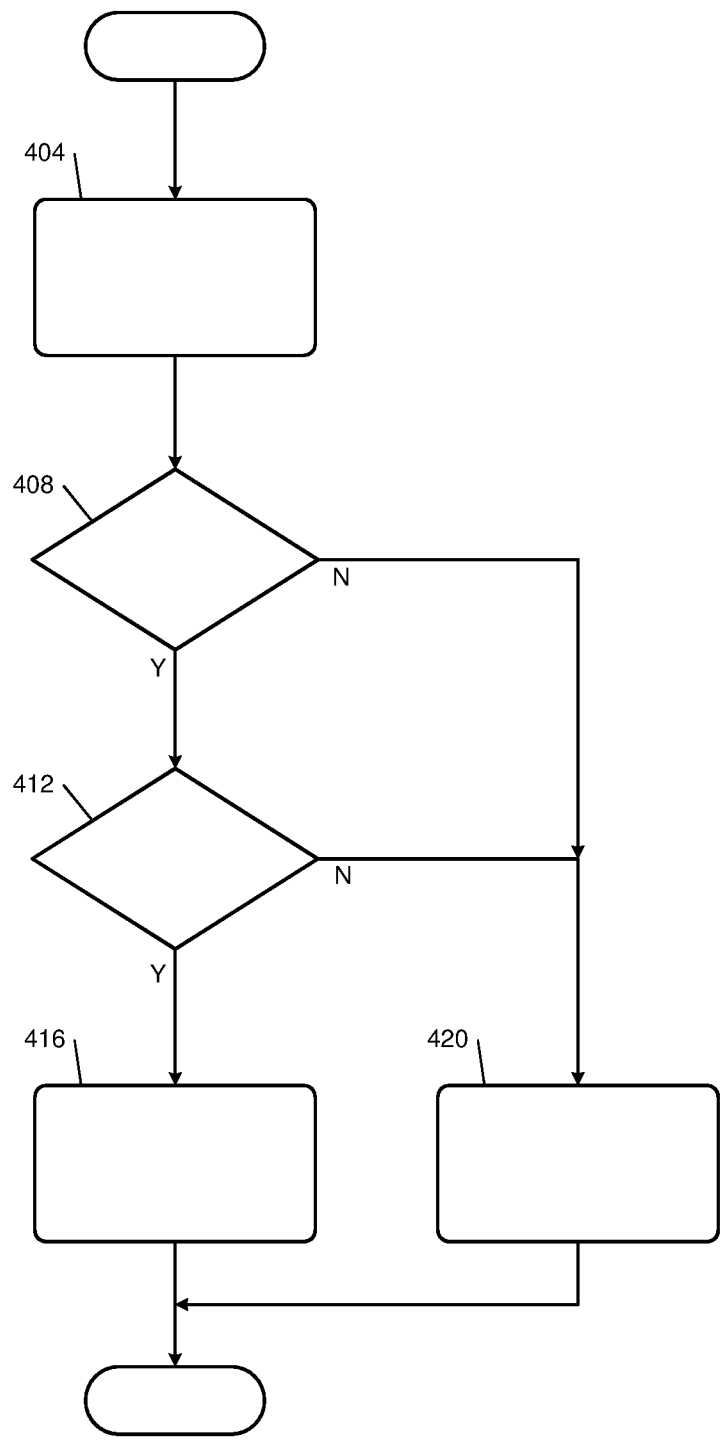

FIG. 4 is a flowchart depicting an example method of adjusting engine parameters for maintaining the catalyst temperature 288 above the light-out temperature while the engine 102 is operating in the lean burn mode with the throttle valve 112 in the fully open position. Control begins with 404 where the engine speed module 274 determines the engine speed 276 based on the crankshaft position. Additionally, the torque request module 204 determines the torque request 208 based on the driver inputs 212 at 404.

At 408, the adjustment module 280 determines whether the engine speed 276 is less than the predetermined engine speed (e.g., approximately 3000 RPM). If 408 is true, control continues with 412. If 408 is false, control transfers to 420, which is discussed further below.

At 412, the adjustment module 280 determines whether the torque request 208 is less than the predetermined torque (e.g., 600 kPa BMEP). If 412 is true, the adjustment module 280 may delay combustion via the adjustment 284 at 416. At 416, based on the adjustment 284, the spark control module 224 may set the target spark timing 228 to the predetermined retarded spark timing, the EGR control module 260 may set the target EGR opening 264 to the first predetermined EGR opening, the fuel control module 232 may set the target fueling parameters 236 to first predetermined fueling parameters including increasing the air/fuel ratio, and the phaser control module 240 may set the target intake and exhaust cam phaser angles 244 and 248 to the predetermined retarded intake and exhaust cam phaser angles, respectively.

If 412 is false, the adjustment module 280 may advance combustion via the adjustment 284 at 420. At 420, based on the adjustment 284, the spark control module 224 may set the target spark timing 228 to the predetermined advanced spark timing, the EGR control module 260 may set the target EGR opening 264 to the second predetermined EGR opening, the fuel control module 232 may set the target fueling parameters 236 to second predetermined fueling parameters including decreasing the air/fuel ratio, and the phaser control module 240 may set the target intake and exhaust cam phaser angles 244 and 248 to the predetermined advanced intake and exhaust cam phaser angles, respectively. While control is shown and discussed as ending, the example of FIG. 4 may be illustrative of one control loop and control may return to 404.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A catalyst temperature control system of a vehicle, comprising:
    a fuel control module configured to control fuel injection of an engine based on a target air/fuel ratio that is fuel lean relative to a stoichiometric air/fuel ratio and a target fuel injection start timing;
    a spark control module configured to control spark timing of the engine based on a target spark timing;
    an exhaust gas recirculation (EGR) control module configured to, based on a target EGR opening, control opening of an EGR valve that recirculates exhaust from an exhaust system of the engine back to an intake system of the engine;
    a throttle control module configured to control opening of a throttle valve based on a target throttle opening; and
    an adjustment module configured to, when a temperature of a catalyst in the exhaust system of the engine is less than a sum of a predetermined light-out temperature of the catalyst and a predetermined temperature and the target air/fuel ratio is fuel lean relative to the stoichiometric air/fuel ratio, based on a comparison of an engine speed and a predetermined engine speed, selectively adjust at least one of:
        the target throttle opening;
        the target spark timing;
        the target fuel injection start timing;
        the target air/fuel ratio; and
        the target EGR opening.

2. The catalyst temperature control system of claim 1 wherein the adjustment module is configured to, when the engine speed is greater than the predetermined engine speed, at least one of:
    advance the target spark timing;
    advance the target fuel injection start timing;
    decrease the target air/fuel ratio; and
    increase the target EGR opening.

3. The catalyst temperature control system of claim 2 wherein the adjustment module is configured to, when the engine speed is greater than the predetermined engine speed, all of:
    advance the target spark timing;
    advance the target fuel injection start timing;
    decrease the target air/fuel ratio; and
    increase the target EGR opening.

4. The catalyst temperature control system of claim 2 wherein the adjustment module is configured to, when the engine speed is less than the predetermined engine speed, at least one of:
    retard the target spark timing;
    retard the target fuel injection start timing;
    increase the target air/fuel ratio; and
    decrease the target EGR opening.

5. The catalyst temperature control system of claim 4 wherein the adjustment module is configured to, when the engine speed is less than the predetermined engine speed, all of:
    retard the target spark timing;
    retard the target fuel injection start timing;
    increase the target air/fuel ratio; and
    decrease the target EGR opening.

6. The catalyst temperature control system of claim 4 wherein the adjustment module is configured to:
when the engine speed is greater than the predetermined engine speed:
advance the target spark timing;
advance the target fuel injection start timing;
decrease the target air/fuel ratio; and
increase the target EGR opening; and
when the engine speed is less than the predetermined engine speed:
retard the target spark timing;
retard the target fuel injection start timing;
increase the target air/fuel ratio; and
decrease the target EGR opening.

7. The catalyst temperature control system of claim 1 wherein the adjustment module is configured to:
adjust the target throttle opening toward a fully open throttle position as the temperature of the catalyst increases; and
adjust the target throttle opening away from the fully open throttle position as the temperature of the catalyst decreases.

8. The catalyst temperature control system of claim 1 wherein the adjustment module is further configured to, when the temperature of the catalyst is less than the sum of the predetermined light-out temperature of the catalyst and the predetermined temperature and the target air/fuel ratio is fuel lean relative to the stoichiometric air/fuel ratio:
increase an amount of fuel into the exhaust system as the temperature of the catalyst decreases; and
decrease the amount of fuel into the exhaust system as the temperature of the catalyst increases.

9. The catalyst temperature control system of claim 1 wherein the predetermined temperature is greater than zero.

10. A catalyst temperature control system of a vehicle, comprising:
a fuel control module configured to control fuel injection of an engine based on a target air/fuel ratio that is fuel lean relative to a stoichiometric air/fuel ratio and a target fuel injection start timing;
a spark control module configured to control spark timing of the engine based on a target spark timing;
a phaser control module configured to control an intake cam phaser angle based on a target intake cam phaser angle and to control an exhaust cam phaser angle based on a target exhaust cam phaser angle;
an exhaust gas recirculation (EGR) control module configured to, based on a target EGR opening, control opening of an EGR valve that recirculates exhaust from an exhaust system of the engine back to an intake system of the engine;
a throttle control module configured to control opening of a throttle valve based on a target throttle opening; and
an adjustment module configured to maintain a temperature of a catalyst in the exhaust system above a predetermined light-out temperature of the catalyst, based on (i) a first comparison of a torque request with a predetermined torque and (ii) a second comparison of an engine speed with a predetermined engine speed, selectively adjusting at least one of:
the target throttle opening;
the target air/fuel ratio;
the target fuel injection start timing;
the target spark timing;
the target intake cam phaser angle;
the target exhaust cam phaser angle; and
the target EGR opening.

11. The catalyst temperature control system of claim 10 wherein the adjustment module is configured to maintain the temperature of the catalyst above the predetermined light-out temperature by, based on (i) the first comparison of the torque request with the predetermined torque and (ii) the second comparison of the engine speed with the predetermined engine speed, selectively adjusting at least two of:
the target throttle opening;
the target air/fuel ratio;
the target fuel injection start timing;
the target spark timing;
the target intake cam phaser angle;
the target exhaust cam phaser angle; and
the target EGR opening.

12. The catalyst temperature control system of claim 10 wherein the adjustment module is configured to maintain the temperature of the catalyst above the predetermined light-out temperature by, based on (i) the first comparison of the torque request with the predetermined torque and (ii) the second comparison of the engine speed with the predetermined engine speed, selectively adjusting all of:
the target throttle opening;
the target air/fuel ratio;
the target fuel injection start timing;
the target spark timing;
the target intake cam phaser angle;
the target exhaust cam phaser angle; and
the target EGR opening.

13. The catalyst temperature control system of claim 10 wherein the adjustment module is configured to maintain the temperature of the catalyst above the predetermined light-out temperature by:
adjusting the target throttle opening toward a fully open throttle position as the temperature of the catalyst increases; and
adjusting the target throttle away from the fully open throttle position as the temperature of the catalyst decreases.

14. The catalyst temperature control system of claim 10 wherein the adjustment module is further configured to maintain the temperature of the catalyst above the predetermined light-out temperature by, when the temperature of the catalyst is less than a sum of the predetermined light-out temperature of the catalyst and a predetermined temperature and the target air/fuel ratio is fuel lean relative to the stoichiometric air/fuel ratio:
increasing an amount of fuel into the exhaust system as the temperature of the catalyst decreases; and
decreasing the amount of fuel into the exhaust system as the temperature of the catalyst increases.

15. The catalyst temperature control system of claim 10 wherein the adjustment module is configured to maintain the temperature of the catalyst above the predetermined light-out temperature by, when the torque request is less than the predetermined torque:
increasing the target air/fuel ratio;
retarding the target fuel injection start timing;
retarding the target spark timing;
retarding the target intake cam phaser angle;
retarding the target exhaust cam phaser angle; and
decreasing the target EGR opening.

16. The catalyst temperature control system of claim 10 wherein the adjustment module is configured to maintain the temperature of the catalyst above the predetermined light-out temperature by, when the engine speed is less than the predetermined engine speed:

increasing the target air/fuel ratio;
retarding the target fuel injection start timing;
retarding the target spark timing;
retarding the target intake cam phaser angle;
retarding the target exhaust cam phaser angle; and
decreasing the target EGR opening.

17. The catalyst temperature control system of claim 10 wherein the adjustment module is configured to maintain the temperature of the catalyst above the predetermined light-out temperature by, when the torque request is less than the predetermined torque and the engine speed is less than the predetermined engine speed:
increasing the target air/fuel ratio;
retarding the target fuel injection start timing;
retarding the target spark timing;
retarding the target intake cam phaser angle;
retarding the target exhaust cam phaser angle; and
decreasing the target EGR opening.

18. The catalyst temperature control system of claim 17 wherein the adjustment module is further configured to, when the torque request is greater than the predetermined torque:
decrease the target air/fuel ratio;
advance the target fuel injection start timing;
advance the target spark timing;
advance the target intake cam phaser angle;
advance the target exhaust cam phaser angle; and
increase the target EGR opening.

19. The catalyst temperature control system of claim 17 wherein the adjustment module is further configured to, when the engine speed is greater than the predetermined engine speed:
decrease the target air/fuel ratio;
advance the target fuel injection start timing;
advance the target spark timing;
advance the target intake cam phaser angle;
advance the target exhaust cam phaser angle; and
increase the target EGR opening.

20. The catalyst temperature control system of claim 17 wherein the adjustment module is further configured to, when the engine speed is greater than the predetermined engine speed and the torque request is greater than the predetermined torque:
decrease the target air/fuel ratio;
advance the target fuel injection start timing;
advance the target spark timing;
advance the target intake cam phaser angle;
advance the target exhaust cam phaser angle; and
increase the target EGR opening.

* * * * *